United States Patent
Ruffin (10) Patent No.: US 6,464,171 B2
(45) Date of Patent: *Oct. 15, 2002

(54) LEADING EDGE CHANNEL FOR ENHANCEMENT OF LIFT/DRAG RATIO AND REDUCTION OF SONIC BOOM

(75) Inventor: Stephen M. Ruffin, Decatur, GA (US)

(73) Assignee: Georgia Tech Research Corp., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,079
(22) Filed: Apr. 4, 1997

(65) Prior Publication Data
US 2002/0043589 A1 Apr. 18, 2002

(51) Int. Cl.⁷ .................................................. B64C 1/38
(52) U.S. Cl. ...................... 244/130; 244/35 A; 244/210
(58) Field of Search ............................. 244/130, 35 R, 244/35 A, 210, 198, 1 N, 3.21, 3.22

(56) References Cited

U.S. PATENT DOCUMENTS

| 35,103 A | * | 4/1862 | Mansfield |
| 2,507,611 A | * | 5/1950 | Pappas et al. |
| 2,624,281 A | * | 1/1953 | McNally |
| 2,916,230 A | * | 12/1959 | Nial |
| 2,979,284 A | * | 4/1961 | Genden et al. |
| 3,298,636 A | * | 1/1967 | Arnholdt |
| 3,314,629 A | * | 4/1967 | Rethorst |
| 3,596,852 A | * | 8/1971 | Wakefield |
| 3,794,274 A | * | 2/1974 | Eknes .................. 244/1 N |
| 4,369,940 A | * | 1/1983 | Kelly et al. |
| 4,522,357 A | * | 6/1985 | Bains et al. |
| 4,573,648 A | * | 3/1986 | Morenus et al. |
| 5,016,835 A | * | 5/1991 | Kranz |
| 5,255,881 A | * | 10/1993 | Rao |
| 5,358,156 A | * | 10/1994 | Rethorst .................. 244/35 A |

FOREIGN PATENT DOCUMENTS

| FR | 957054 | * | 4/1945 | .................. 244/210 |
| GB | 573555 | * | 11/1945 | .................. 244/40 |

OTHER PUBLICATIONS

Anderson, John. Hypersonic and High Temperature Gas Dynamics. 1989. McGraw–Hill. New York, New York.*
AIAA 90–1596 Supersonic Aircraft Drag Reduction, D. Bushnell, AIAA 21st Fluid Dynamics, Plasma Dynamics and Lasers Conference Jun. 18–20, 1990/Seattle, WA.
An Overview of Concepts for Aircraft Drag Reduction, J. Hefner & D. Bushnell, Special Course on Concepts for Drag Reduction, AGARD Report No. 654, AGARD Special Course, von Karman Institute, Rhode–St–Genese, Belgium Mar. 28–Apr. 1, 1977.
The Aerodynamic Design of Aircraft, D. Kuchemann, FRS, pp. 465–496 (Pergammon Press, 1978).
Sonic Boom Minimization, R. Seebass and A.R. George, J. Acoustical Society of American, vol. 51, No. 2 (Part 3), pp. 686–694 (1972).
Sonic Boom Theory: Its Status in Prediction and Minimization, Christine M. Darden, J. Aircraft, vol. 14, No. 6, Jun. 1977, pp. 569–576.

(List continued on next page.)

Primary Examiner—Charles T. Jordan
Assistant Examiner—T. Dinh
(74) Attorney, Agent, or Firm—Todd Deveau; Jacqueline Haley; Troutmann Sanders LLP (57) ABSTRACT

The leading edges of wings, nose assemblies, tails, fins, struts, and other components of aircraft, atmospheric entry vehicles and missiles in which the leading edge is blunted and the flight Mach number is supersonic, are provided with passive airflow channel, resulting in significantly reduced wave drag and total drag, significantly increased lift-to-drag ratio, and reduced sonic boom.

22 Claims, 8 Drawing Sheets

OTHER PUBLICATIONS

Wind–Tunnel Investigation of the Valodity of a Sonic–Boom–Minimozation Concept, Robert J. Mack and Christine M. Darden, NASA Technical Paper 1421, 1979, pp. 1–44.

AIAA 91–3103 HSCT Designs for Reduced Sonic Boom, George T. Haglund, AIAA Aircraft Design Systems and Operations Meeting, Sep. 23–25, 1991/Baltimore, Maryland pp. 1–16.

A Methodology for Designing Aircraft to Low Sonic Boom Constraints, Robert J. Mack, Kathy E. Neddleman, NASA Technical Memorandum 4246, 1991 pp. 1–21.

A Wind Tunnel Investigation of the Effect of Body Shape On Sonic Boom Pressure Distributions, Harry W. Carlson, Robert J. Mack, and Odell A. Morris, NASA Technical Note D–3106, pp. 1–32 (Nov. 1965).

The Flow of a Jet From a Body Opposing a Supersonic Free Stream, P.J. Finley, Journal of Fluid Mechanics (1966), vol. 26, part 2, pp. 337–368.

An Experimental Investigation of the Effect of Ejecting a Coolant Gas at the Nose of a Bluff Body, C.H.E. Warren, Journal of Fluid Mechanics, vol. 8, part 3, pp. 400–417 (1959).

Evaluation of a Supersonic Channel Airfoil Concept, Aerothermodynamics Research & Technology Lab, A. Gupta, Georgia Tech, Apr. 5, 1996.

AIAA 97–0517, Supersonic Channel–Airfoils for Reduced Drag, S.M. Ruffin and A. Gupta, 35th Aerospace Sciences Meeting & Exhibit, Jan. 6–10, 1997/Reno, Nevada.

* cited by examiner

LEADING EDGE CHANNEL FOR ENHANCEMENT OF LIFT/DRAG RATIO AND REDUCTION OF SONIC BOOM

BACKGROUND OF THE INVENTION

1. Field of the Invention

The present invention relates generally to the field of supersonic aeronautics, and relates more specifically to a novel supersonic or hypersonic body section design incorporating one or more hollow channels in the body section that allow freestream air to flow through the channel(s) resulting in reduced drag and sonic boom.

2. Description of Related Art

A variety of supersonic and hypersonic vehicles are currently being studied for commercial and military applications. However, existing supersonic and hypersonic technology suffers from several drawbacks. For example, aerodynamic drag is substantial at supersonic and hypersonic speeds, and adds significantly to fuel expenses. Also, noise due to sonic booms has been found objectionable, in particular, by those living under flight paths and near airports.

The advantages of supersonic and hypersonic transport, however, justify continued research and development directed to overcoming these drawbacks. For example, the high speed civil transport (HSCT) aircraft is designed to cruise at a free stream Mach number of approximately $M_\infty=2.4$ and seeks to overcome the economic and environmental barriers that have limited the success of previous supersonic commercial concepts. Other supersonic flight vehicles of significant interest include single-stage-to-orbit (SSTO) and multi-stage launch vehicles, tactical and strategic hypersonic and supersonic missiles, hypersonic cruise aircraft and planetary entry vehicles. These vehicles are similar in that their range, payload mass fractions and economic feasibility are extremely sensitive to aerodynamic drag.

A discussion of the effects of drag reduction on such supersonic vehicles is given by Bushnell, D., Supersonic Aircraft Drag Reduction, AIAA Paper 90-1596, 1990. If the lift-to-drag ratio (L/D) of the HSCT at cruise is increased by just 10% there would be a significant positive impact on the economy and success of that vehicle. Proposed hypersonic vehicles such as the National Aerospace Plane and X-30 have not advanced due, in part, to diminishing projected payload margins and concerns regarding airbreathing engine capabilities. As pointed out in Bushnell, drag reductions allow lower fuel requirements and can lead to reduced operating costs, as well as reduced sonic boom and noise effects. Reviews of supersonic drag reduction techniques also are given by Hefner, J. N., and Bushnell, D. M., An Overview of Concepts for Aircraft Drag Reduction, AGARD Rep. 654, June, 1977, pp. 1–1 to 1–30; and by Jones, R. T., Aerodynamic Design for Supersonic Speeds, Adv. in Aero. Science, Vol. 1, 1959, pp. 34–52

A schematic of a typical drag breakdown, taken from Kuchemann, D., The Aerodynamic Design of Aircraft, Pergamon Press, Ltd., 1978, for supersonic vehicles ($M_\infty=2.4$) is shown. The vehicle drag coefficient is shown as a function of the product of $\beta=\sqrt{M_\infty^2-1}$ and the semispan to length ratio, s/l. It should be noted that vehicles with s/l lower than approximately 0.2 (i.e. vehicles whose wings are extremely swept) are impractical due to excessive required runway lengths. Note also that $s/\beta l=1$ corresponds to the case in which the Mach number normal to the wing leading edge is sonic. The drag on supersonic vehicles can be classified into three different categories: (1) skin friction drag, (2) drag due to lift, and (3) zero-lift bluntness (thickness-wave) drag. Skin friction drag is due to fluid viscosity and is a function of the total wetted surface area of the vehicle. Drag due to lift consists of induced drag and the component of wave drag which is a function of the inclination of the vehicle surfaces with respect to the freestream direction at a non-zero lift orientation. Finally, the zero-lift bluntness drag is the wave drag due to the thickness and bluntness of the leading and trailing edges of the vehicle in a zero lift orientation. The zero-lift bluntness drag (i.e. thickness-wave drag) increases rapidly with freestream Mach number and can be responsible for well over ⅓ of the total vehicle drag.

Linearized supersonic theory indicates that for an airfoil of a given thickness, the shape which gives minimum zero-lift bluntness drag is the sharp diamond airfoil. However, very sharp leading edges are not practical for a number of reasons: (1) very sharp leading edges are difficult and expensive to manufacture; (2) some blunting is required for structural strength, (3) the flow over wings with sharp leading edges is very susceptible to separation even at low angles of attack and flight speeds; and (4) the heat transfer to sharp leading edges at high supersonic Mach numbers is severe.

For hypersonic vehicles, heat transfer considerations often dictate the design of the nose and the leading edges. The heat transfer to such vehicles is most severe at stagnation points which occur on the leading edges and nose of the vehicle. Theoretical and numerical predictions of stagnation point heating have been developed by Fay, J., and Riddell, F., Theory of Stagnation Point Heat Transfer in Dissociated Air, J. Aero. Sci., Vol. 25, pp. 73–85, February, 1958, and are also described by Anderson, J. D., Hypersonic and High Temperature Gas Dynamics, McGraw-Hill, Inc., New York, 1989. Kemp and Riddell have developed an accurate semi-empirical relation for stagnation point heat transfer. Kemp, N., and Riddell, F., Heat Transfer to Satellite Vehicles Re-entering the Atmosphere, Jet Propulsion, pp. 132–137, February, 1957. Theoretical formulations, experimental data, and semi-empirical formulas all agree in the fact that stagnation point heat transfer is inversely proportional to the square root of the nose or leading edge radius, i.e., $$q_{stag} \propto \frac{1}{\sqrt{r_n}}$$

Thus, sharp leading edges (i.e., $r_n=0$) experience extreme heat transfer, which may melt or otherwise damage the component. Therefore, the nose, leading edges of wings, tails, fins, struts, cowls, and other appendages of supersonic and hypersonic vehicles are blunted so that the heat transfer and structural loads will be manageable. With leading edge blunting, the simple diamond airfoil is modified. However, much of the wave drag experienced by these vehicles is due to leading edge blunting. Wave drag is responsible for approximately one-third of the total drag experienced by aircraft, atmospheric entry vehicles, missiles, and other vehicles in supersonic and hypersonic flight.

For vehicles which cruise at low supersonic Mach numbers, heat transfer considerations do not dictate the design of the wing leading edges. At subsonic, off-design conditions, such as takeoff, landing, climb and maneuvering flight, blunted leading edges are desirable so that flow separation is prevented. However, a blunted leading edge results in higher drag at supersonic cruise conditions relative to a wing with a sharp leading edge. Therefore, it has been found desirable that airfoils utilized in such applications be significantly blunted during subsonic maneuvering phases of flight, but perform more like sharp leading-edge airfoils at supersonic cruise conditions. The provision of such an airfoil is one object of the present invention.

Sonic boom has also been found to limit the application of supersonic and hypersonic transport. To date, the most successful strategies utilized for minimization of sonic boom stem from evaluation of the Whitman F-Function. Whitman, G. B., The Flow Pattern of a Supersonic Projectile, Communications on Pure and Applied Mathematics, Vol. V., 1952, pp. 301–348. See also Carlson, H. W., and Maglieri, D. J., Review of Sonic Boom Generation Theory and Prediction Methods, Journal of Acoustical Society of America, Vol. 51, 1972, pp. 675–685; and Middleton, W. D., and Carlson, H. W., A Numerical Method for Calculating Near-Field Sonic-Boom Pressure Signatures, NASA TN D-3082, 1965. The F-Function is based on the cross-sectional area distribution and the lift distribution of the generating vehicle. Modified linearized theory and geometric acoustics are used to determine ground pressure and signatures from the F-Function. Studies by Seebass and George, and Darden have demonstrated that mid-field and far-field over-pressures are minimized when a perfectly blunt (i.e. flat face) nose is utilized on the vehicle. Seebass, R. and George, A. R., Sonic Boom Minimization, Journal of the Acoustical Society of America, Vol. 51, No. 2, Part 3, 1972, pp. 686–694; Darden, C. M., Sonic Boom Theory: Its Status in Prediction and Minimization, Journal of Aircraft, Vol. 14, No. 6, 1977, pp. 569–576.

When a blunt nose is utilized, the subsequent compressions are weak. However, for sharp-nosed vehicles, subsequent compressions around the vehicle tend to be strong and coalesce at mid-field and far-field into a much stronger over-pressure relative to a blunt nose geometry. Significantly blunted supersonic cruise vehicles have not been utilized, however, because the wave drag of such vehicles becomes unreasonably high. The relationship between nose bluntness and boom characteristics has been validated experimental studies. Carlson, H. W., Mack, R. J., Morris, O. A., A Wind Tunnel Investigation of the Effect of Body Shape on Sonic-Boom Pressure Distributions, NASA TN D-3106, November 1965, and Mack, R. J. and Darden, C. M., Wind Tunnel Investigation of the Validity of a Sonic-Boom-Minimization Concept, NASA TP-1421, 1979. The studies by Darden of vehicles with a relaxed level of nose bluntness clearly show that a minimum boom must be paid for by higher drag penalties.

Optimization studies have sought to find a palatable compromise for this "low-boom, high-drag paradox" but breakthroughs in design of aerodynamically efficient, low boom vehicles require consideration of innovative approaches in vehicle design. Various approaches are described, for example, by: Haglund, G. T., HSCT Designs for Reduced Sonic Boom, AIAA Paper 91-3103, AIAA Aircraft Design Systems and Operations Meeting, September 1991; Mack, R. J. Needleman, K. E., A Methodology for Designing Aircraft to Low Sonic Boom Constraints, NASA TM 4246; Yoshida, K., and Tokuyama, A., Improving the Lift to Drag Characteristics of Low Boom Configuration, AIAA Paper 92-4218, August, 1992; Yoshida, K., Experimental and Numerical Study for Aerodynamics of Low Boom Configuration, AIAA Paper 94-0052, Aerospace Sciences Meeting, January 1994; and Darden, C. M., Sonic Boom Theory: Its Status in Prediction and Minimization, Journal of Aircraft, Vol. 14, No. 6, 1977, pp. 569–576.

It is known to provide a reverse flow airfoil in which air is actively pulled into the trailing edge of an airfoil through a duct and ejected forward out of the leading edge of the airfoil. Kucheman, D., Some Aerodynamic Properties of a New Type of Aerofoil with Reversed Flow Through an Internal Duct, RAE TN Aero 2297, 1954. Several studies have been performed for supersonic flow in which either air or some other gas is forcibly ejected forward out of the blunt nose of axisymmetric bodies. Kucheman, D., Some Aerodynamic Properties of a New Type of Aerofoil with Reversed Flow Through an Internal Duct, RAE TN Aero 2297, 1954; Finley, P. J., A Preliminary Investigation of the Steadiness of a Free Stagnation Point, J. Dept. of Engineering, University of Malaya, Vol. 4, 8, 1965; Finley, P. J., The Flow of a Jet from a Body Opposing a Supersonic Free Stream, Journal of Fluid Mechanics, Vol. 26, 337, 1966; McMahon, H. M., An Experimental Study of the Effect of Mass Injection at the Stagnation Point of a Blunt Body, GALCIT Memo 42, 1958; Lam, S. H., Interaction of a Two Dimensional Inviscid Incompressible Jet Facing a Hypersonic Stream, AFOSR R 447, 1959; Eminton, E., Orifice Shapes for Ejecting Gas at the Nose of a Body in Two Dimensional Flow, RAE TN Aero 2711, 1960; Warren, C. H. E., An Experimental Investigation of the Effect of Ejecting a Coolant Gas at the Nose of a Blunt Body, GALCIT Memo 47, 1958, and Journal of Fluid Mechanics, Vol. 8, 400, 1960; and Reid, J., and Tucker, L. M., Forward Ejection From Swept and Unswept Leading Edges, RAE TR 68095, 1968. This technique causes the existence of a stagnation point in front of the duct and is a means of providing active cooling at the nose. However this technique suffers the disadvantage that it requires that significant power be supplied from the engines to pump the flow against a supersonic freestream. By contrast, in the present invention, only passive flow of air through the channel is necessary.

Thus, it can be seen that a need yet exists for a supersonic and/or hypersonic body configuration which minimizes the body's drag without adversely affecting its lift characteristics.

A need further exists for a method of reducing drag on airfoils and other bodies in supersonic or hypersonic flow, without adversely affecting their lift characteristics.

Still a further need exists for a method of reducing sonic boom associated with a supersonic or hypersonic body while reducing the total drag of the body as compared to conventional blunted geometries.

A need also exists for a supersonic body configuration which presents an overall flow structure similar to that of conventional, low sonic boom, blunted geometry body configurations, but with reduced drag.

It is to the provision of a method and apparatus meeting these and other needs that the present invention is primarily directed.

BRIEF SUMMARY OF THE INVENTION

Briefly described, in preferred form, the present invention comprises a method of reducing the drag and the sonic boom generated by a supersonic body. The present invention also comprises a supersonic body configuration having an improved lift/drag ratio and reduced sonic boom.

Instead of significant blunting of the leading edge, the present invention provides a hollow channel in the vehicle nose and in airfoil sections that make up the wings, tails, fins, struts, cowls, and other appendages of supersonic and hypersonic vehicles. The channel preferably begins at or adjacent the leading edge of the component, with the freestream air flowing through the channel. The present invention thereby provides significantly reduced wave drag and total drag, including skin friction drag, for a wide range of flight conditions. With a channel of a preferred size, a normal shock exists in front of the airfoil's leading edge, and the surrounding flow is similar to that in front of a blunted airfoil. The heat transfer at the leading edge for this channeled airfoil is also similar to that for a blunted airfoil; however, the wave drag is significantly lower.

The present invention primarily addresses reduction of the zero-lift bluntness drag as a means of reducing the total drag. A reduction of this component of drag and in the total drag can result in increased vehicle range, increased speed, improved fuel efficiency, increased lift/drag ratio, and enhanced performance. An investigation of the drag reduction provided by the present invention for supersonic airfoils and wings has been conducted, and is reported below. A wide range of geometric parameters and supersonic flight conditions are considered, so that the aerothermodynamic performance of airfoils employing the present concept are generally characterized.

Accordingly, it is an object of the present invention to provide a method and apparatus for the reduction of drag and the enhancement of the lift-to-drag ratio of a supersonic body.

It is another object of the present invention to provide a method and apparatus for reducing sonic boom associated with a supersonic body, without adversely affecting the drag on the body.

These and other objects, features and advantages of the present invention will become more apparent upon reading the following specification in conjunction with the accompanying drawing figures.

BRIEF DESCRIPTION OF THE FIGURES

FIG. 5b is a side view of the vehicle and airfoil channel shown by FIG. 5a.

DETAILED DESCRIPTION OF A PREFERRED EMBODIMENT

Figure 1:
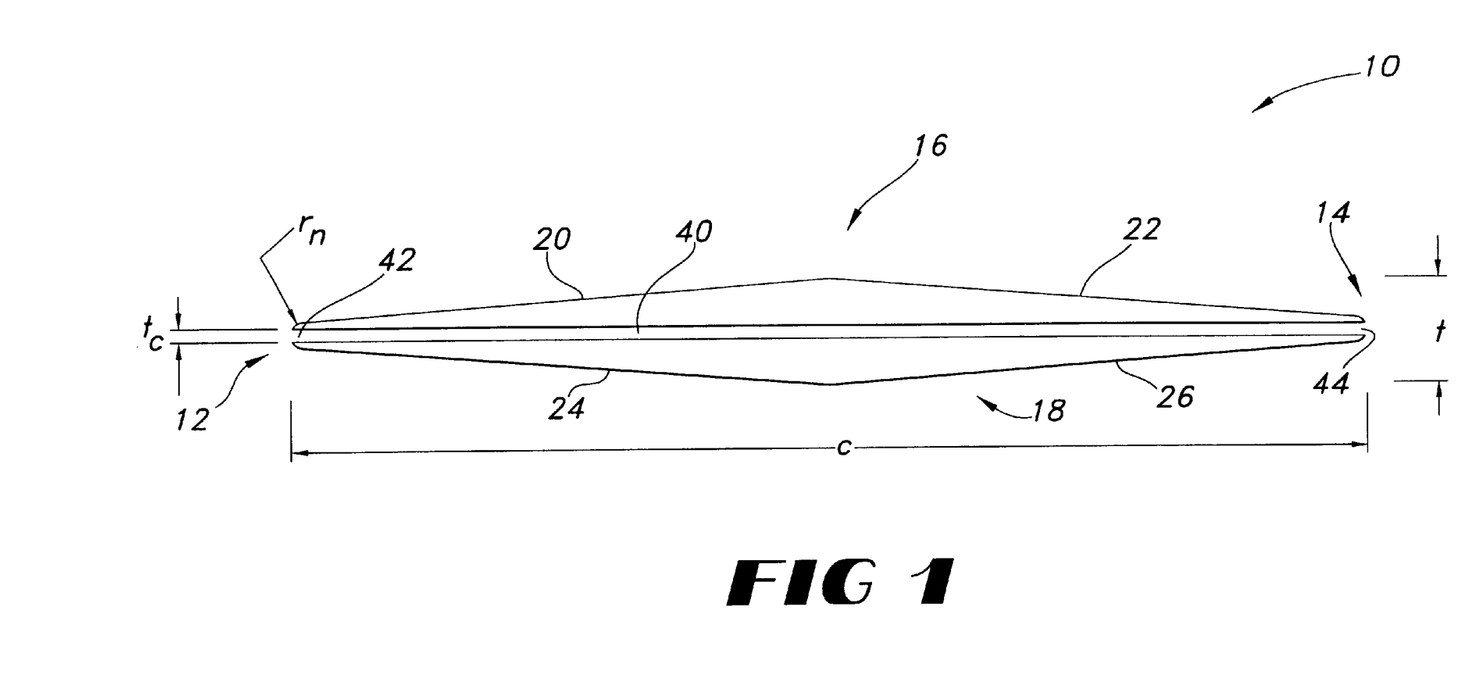
FIG. 1 is a cross-sectional view of a supersonic channel-airfoil according to one form of the present invention.

Referring now in detail to the drawing figures, wherein like reference numerals represent like parts throughout, FIG. 1 shows a diamond airfoil 10 according to a preferred form of the present invention. The diamond airfoil 10 preferably comprises a leading edge 12, a trailing edge 14, an upper surface 16 and a lower surface 18. The leading edge 12 and trailing edge 14 of the airfoil 10 are preferably somewhat blunted, having an external nose radius $r_n$, as shown. The upper surface 16 further comprises a leading upper face 20 and a trailing upper face 22. The lower surface 18 further comprises a leading lower face 24 and a trailing lower face 26. The external dimensions of the airfoil 10 are defined by its chord (c) and its thickness (t).

In order to overcome the above-described disadvantages of known supersonic airfoils, the airfoil 10 of the present invention is provided with a passive airflow channel 40, extending through a portion of the airfoil 10 from a first end 42 adjacent the leading edge 12 of the airfoil 10. In the embodiment depicted by FIG. 1, the channel 40 is generally straight, extending generally through the center of the airfoil 10, along the chord of the airfoil 10, to a second end 44 adjacent the trailing edge 14 of the airfoil 10.

The airflow channel 40 can be provided along substantially the entire length or span of the leading edge, within practical limitations imposed by the vehicle structure, or can be provided along portions or segments of the vehicle's length or span. Closure mechanisms, described in greater detail below, can be provided to permit selective opening or closing of the entire channel 40, or of selected portions or segments of the channel 40, depending upon the flight conditions.

Figure 4A:
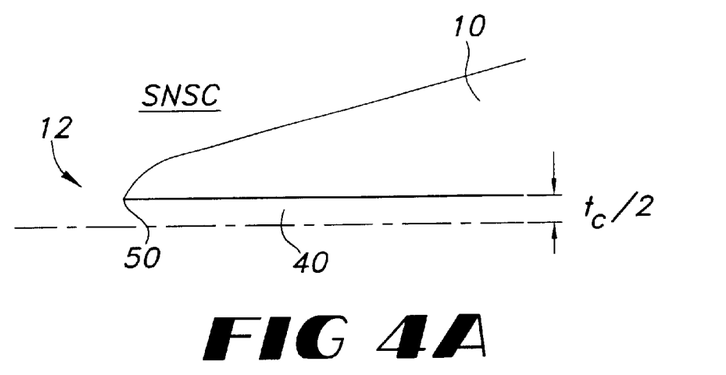
FIG. 4a is a cross-sectional detail of a sharp-nose, straight-channel (SNSC) channel geometry, according to one form of the present invention.
Figure 4B:
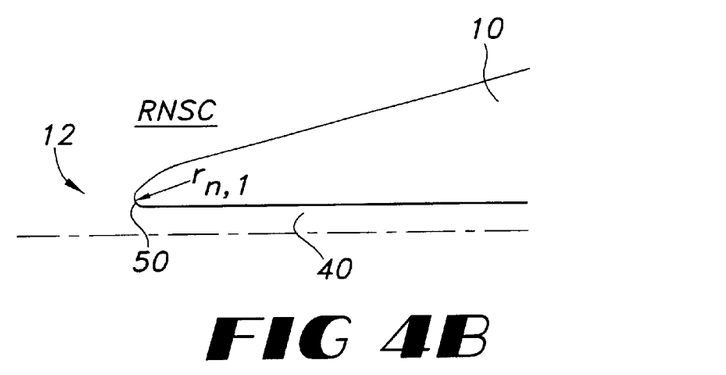
FIG. 4b is a cross-sectional detail of a round-nose, straight-channel (RNSC) channel geometry, according to another form of the present invention.
Figure 4C:
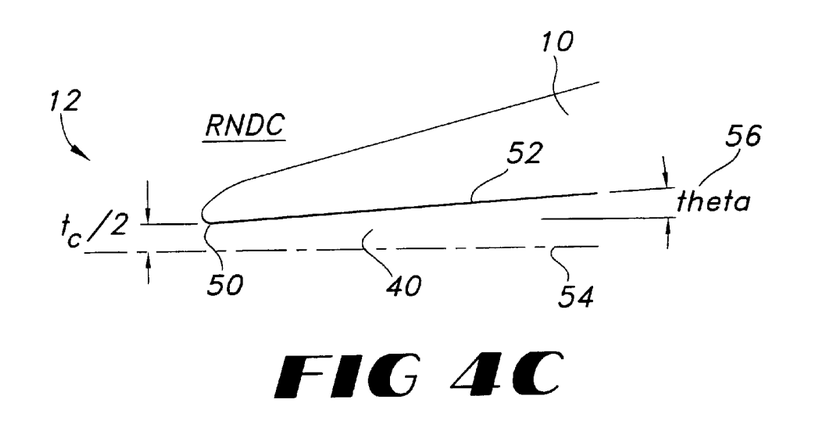
FIG. 4c is a cross-sectional detail of a round-nose, diverging-channel (RNDC) channel geometry according to another form of the present invention.

FIGS. 4a–4c show alternate embodiments of the channel 40, which are within the scope of the present invention. FIG. 4a shows a sharp-nose, straight-channel (SNSC) embodiment of the airfoil 10 of the present invention. In this embodiment, the channel thickness $t_c$ remains generally constant along the length of the channel 40 (i.e., a "straight" channel). The inlet opening at the first end 42 of the channel 40 of this embodiment forms a sharp-edged nose 50. Nose 50 is also sometimes referred to as a channel lip.

FIG. 4b shows a round-nose, straight-channel (RNSC) airfoil according to another form of the present invention. The channel thickness $t_c$ of this embodiment is generally constant along its length, thereby defining a "straight" channel. The opening at the first end 42 of the channel 40 of this embodiment, however, is radiused to form a round nose 50.

FIG. 4c shows a round-nose, diverging-channel (RNDC) airfoil, according to yet another embodiment of the present invention. This embodiment comprises a round nose 50 as described above, and a channel 40 which diverges along its length. The channel thickness $t_c$ of the channel 40 of this embodiment increases along the chordwise direction of the channel 40 away from the leading edge 12. The walls 52 of the channel 40 of this embodiment diverge from the center line 54 of the channel 40 at an angle of divergence 56 (θ). A sharp-nose, diverging-channel (SNDC) embodiment (not shown) is also possible.

Figure 6A:
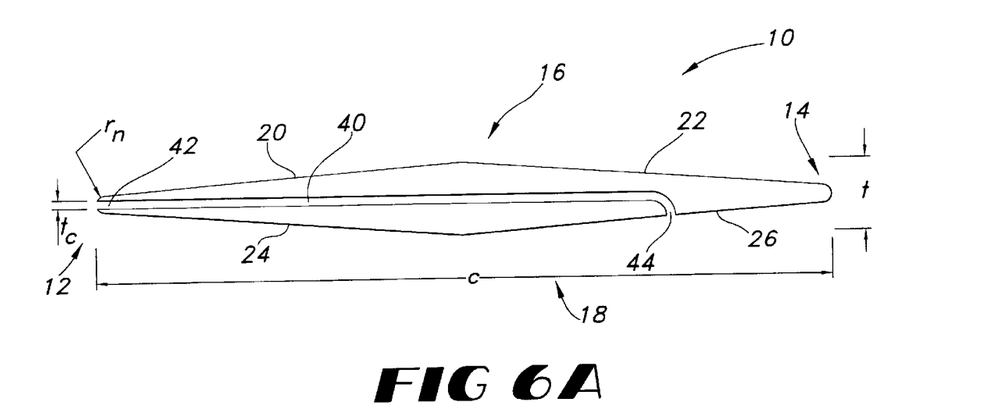
FIG. 6a is a cross-sectional view of a supersonic channel airfoil according to an alternate form of the present invention.
Figure 6B:
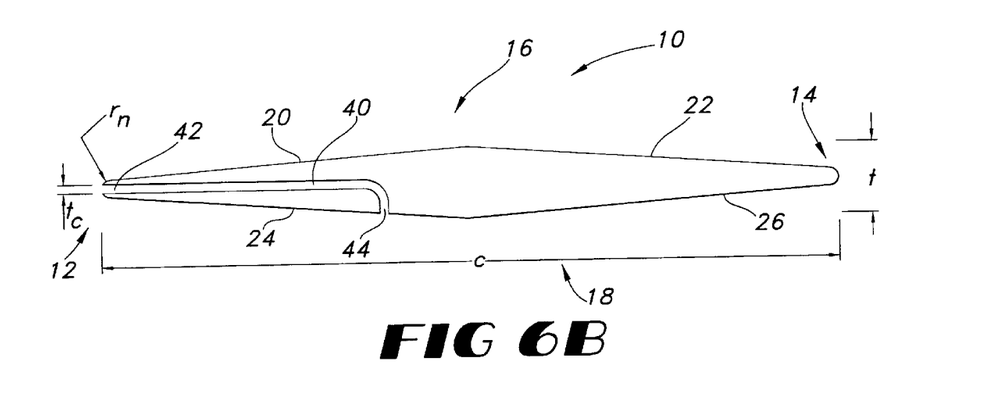
FIG. 6b is a cross-sectional view of a supersonic channel airfoil according to another alternate form of the present invention.
Figure 6C:
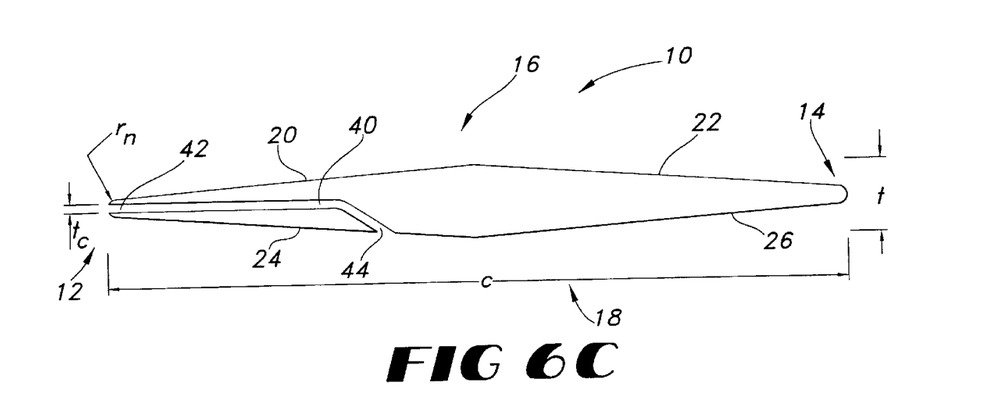
FIG. 6c is a cross-sectional view of a supersonic channel airfoil according to still another alternate form of the present invention.

Further embodiments of an airfoil comprising the passive airflow channel of the present invention are shown in FIGS. 6a–6c. As described in greater detail below, instead of exhausting the airstream flowing through the channel 40 at or near the trailing edge 14 of the airfoil 10, the airstream can be exhausted from other locations on the airfoil 10. For example, FIG. 6a shows the second end 44 of the channel 40 exhausted from the trailing lower face 26. FIGS. 6b and 6c depict embodiments of the airfoil 10 wherein the second end 44 of the channel 40 is exhausted from the leading lower face 24 of the airfoil 10. The performance characteristics of the airfoil 10 can be modified by varying the configuration of the channel 40, as is more fully described below.

Figure 7A:
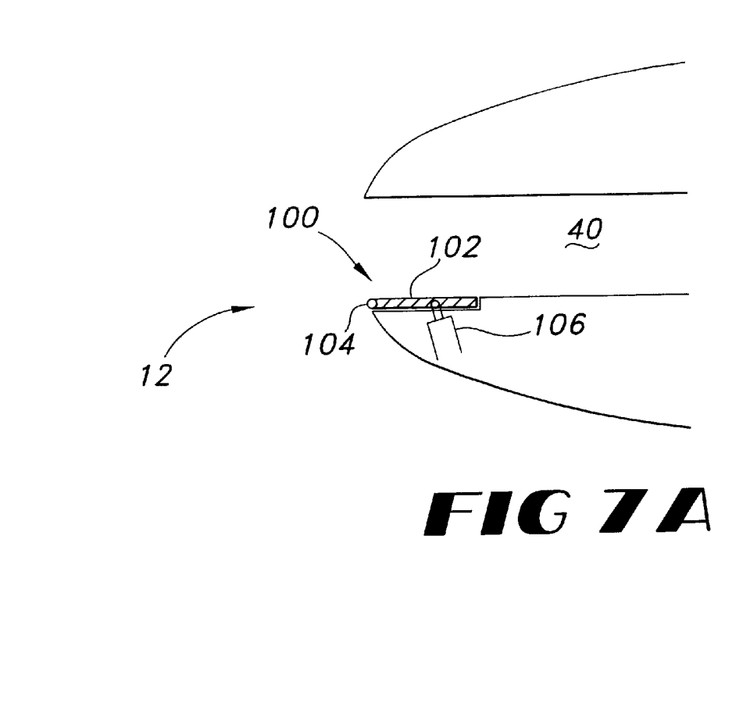
FIG. 7a is a cross-sectional view of the leading edge of an aerodynamic body having a passive airflow channel and a closure mechanism according to one form of the present invention, the closure mechanism being in the "open" position.
Figure 7B:
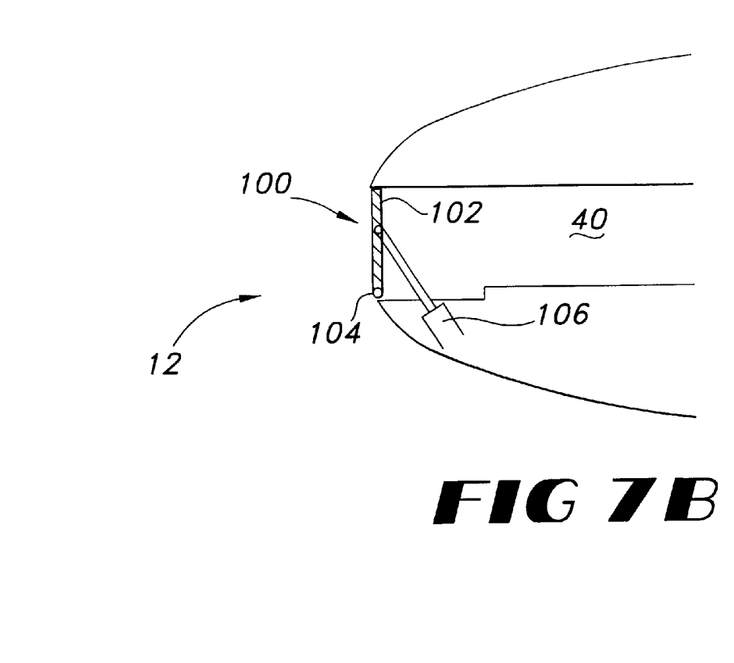
FIG. 7b shows the aerodynamic body and closure mechanism of FIG. 7a, the closure mechanism being in the "closed" position.
Figure 8A:
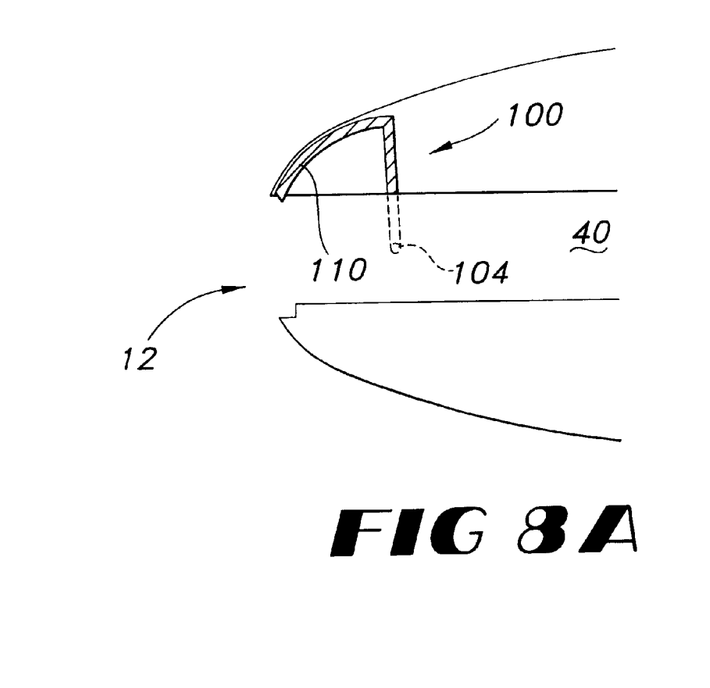
FIG. 8a is a cross-sectional view of the leading edge of an aerodynamic body having a passive airflow channel and a closure mechanism according to another embodiment of the present invention, the closure mechanism being in the "open" position.
Figure 8B:
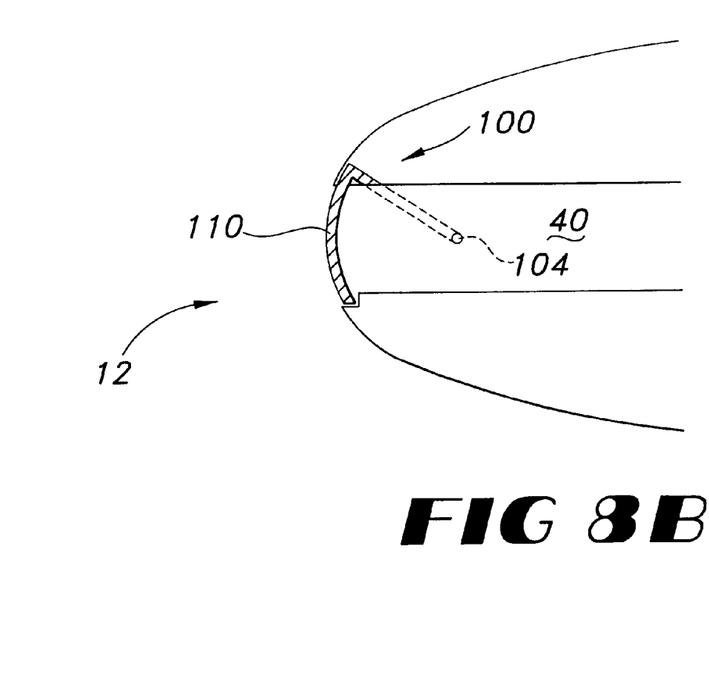
FIG. 8b shows the dynamic aerodynamic body and closure mechanism of FIG. 8a, the closure mechanism being in the "closed" position.
Figure 9A:
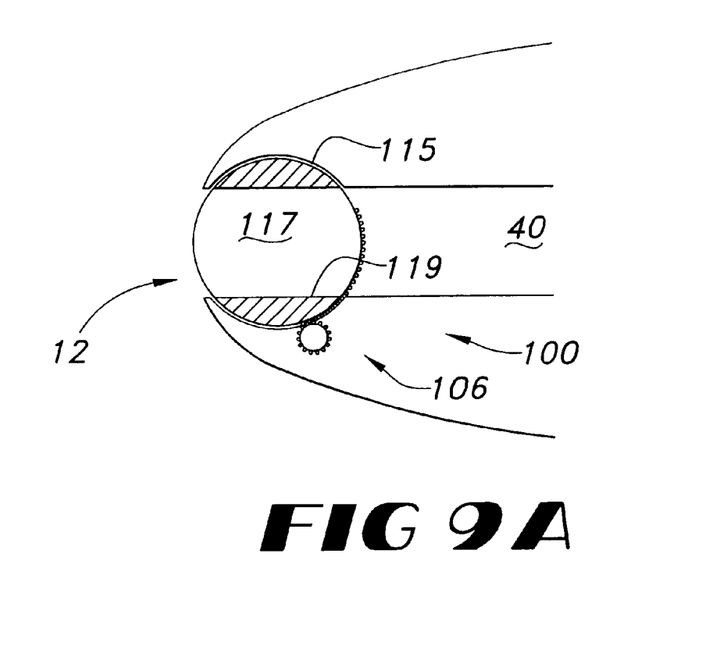
FIG. 9a is a cross-sectional view of the leading edge of an aerodynamic body having a passive airflow channel and a closure mechanism according to yet another embodiment of the present invention, the closure mechanism being in the "open" position.
Figure 9B:
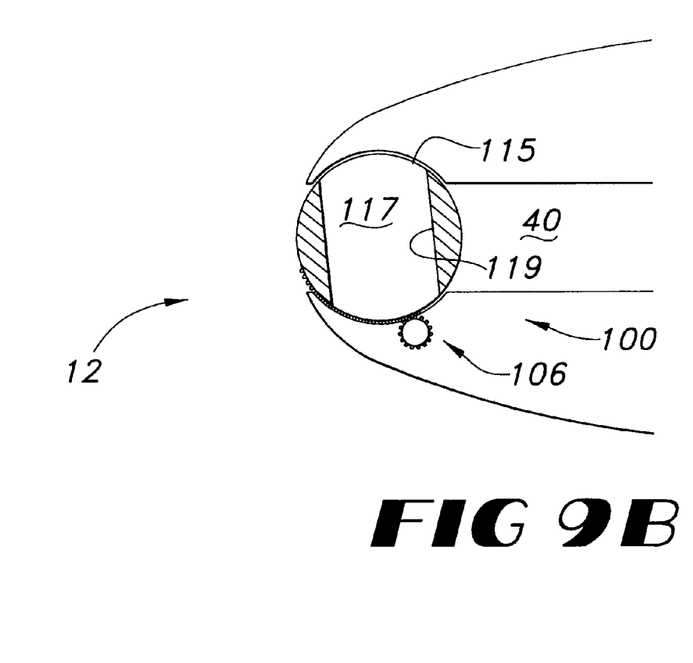
FIG. 9b shows the aerodynamic body and closure mechanism of FIG. 9a, the closure mechanism being in the "closed" position.

For certain applications, as described in greater detail below, it has been found desirable to provide an aerodynamic body with a passive airflow channel which can be selectively opened and closed depending upon the flight conditions. FIGS. 7–9 show several closure mechanisms 100 for enabling selective opening and closure of the channel 40 at the leading edge 12 of an aerodynamic body. FIGS. 7a and 7b show the opened and closed configurations, respectively, of a first embodiment of a closure mechanism 100. This embodiment of the closure mechanism 100 generally comprises a flat plate 102 hingedly connected to the lower nose portion of the aerodynamic body, adjacent the entrance to channel 40, by means of a hinge 104. Actuating means 106, such as a hydraulic or pneumatic cylinder, are provided between the aerodynamic body and the plate 102 for moving plate 102 between the channel open (FIG. 7a) and channel closed (FIG. 7b) positions.

A second embodiment of the closure mechanism 100 is shown in its opened and closed positions by FIGS. 8a and 8b, respectively. This embodiment of the closure mechanism comprises an angled closure gate 110, hingedly connected to the aerodynamic body by means of a hinge 104. Actuating means (unshown) are provided for moving the angled closure gate 110 between its opened and closed configurations. The portion of the angled closure gate 110 which blocks the channel 40 in the closed configuration can be curved to generally match the contour of the leading edge 12 of the aerodynamic body.

A further embodiment of a closure mechanism 100 is shown in its opened and closed positions by FIGS. 9a and 9b, respectively. In this embodiment, a rotating closure element 115 is pivotally mounted adjacent the leading edge 12 of the aerodynamic body. The rotating closure element 115 is preferably generally cylindrical, having a slot 117 provided through its central portion. A section of flexible duct 119 can be provided to connect the slot 117 through the rotating closure element 115 with the channel 40, thereby allowing uninterrupted flow through the channel 40 when the rotating closure element 115 is pivoted into its "opened" configuration shown in FIG. 9a, while allowing the slot 117 to be pivoted out of alignment with the channel 40 in the "closed" configuration shown in FIG. 9b. Actuating means 106, such as a motor drive and gearing are preferably provided for moving the closure mechanism 100 between its opened and closed configurations. The radius of curvature of the rotating closure element 115 of this embodiment of the closure mechanism 100 is preferably selected to generally match the radius of curvature of the aerodynamic body at its leading edge 12, for reduced drag.

Figure 5A:
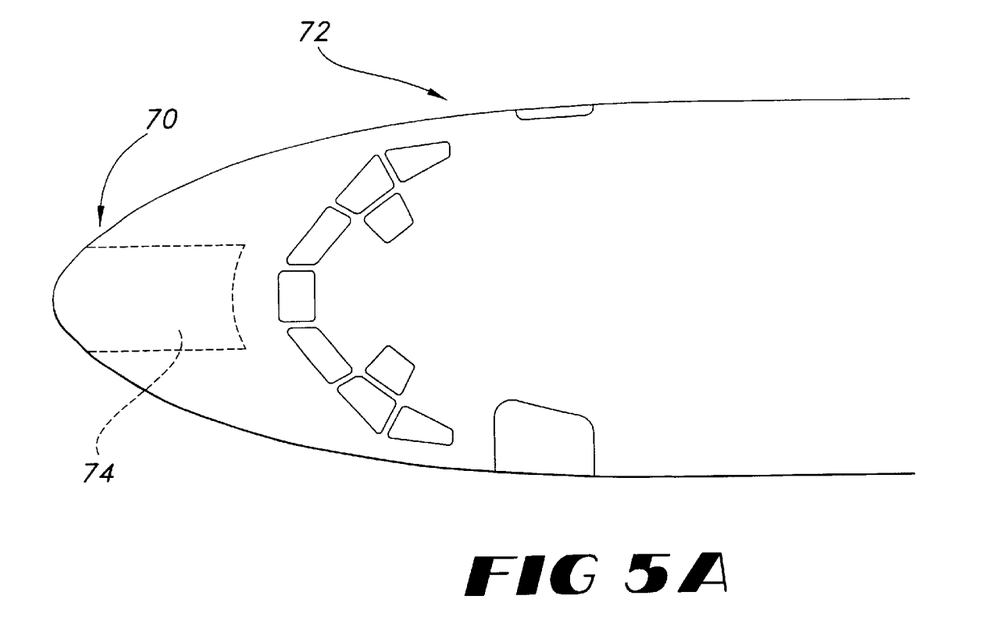
FIG. 5a is a top view of a supersonic vehicle according to one form of the present invention, for allowing freestream air to flow passively through an airfoil channel located in the vehicle nose.
Figure 5B:
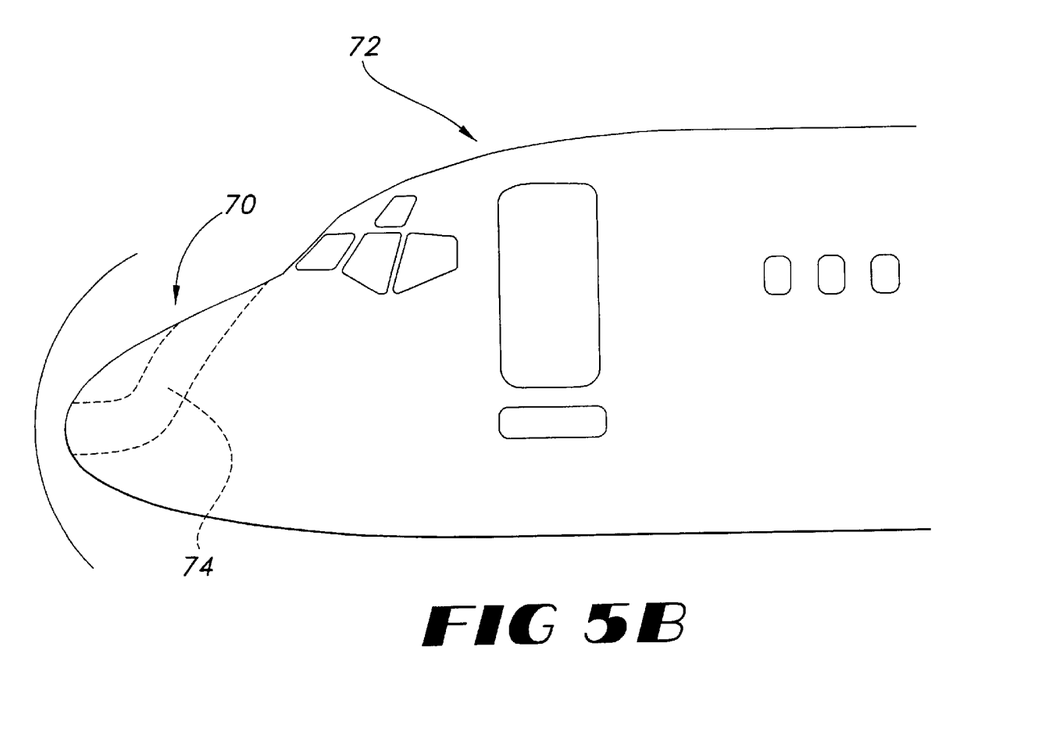

The present invention is described above primarily in connection with an airfoil. However, the passive airflow channel of the present invention, as described herein, may be beneficially applied to a variety of other components of a supersonic vehicle as well. For example, as shown in FIGS. 5a and 5b, the nose cone 70 of an aircraft 72 can be provided with a channel 74, as shown. Computed Mach contours about a blunted sphere-cone nose element including the passive airflow channel of the present invention can be shown. The passive airflow channel of the present invention can be similarly provided to the leading edges of the tail, the fins, struts, and other components of aircraft, atmospheric entry vehicles, missiles, and other supersonic vehicles to reduce drag and sonic boom. Moreover, the passive airflow channel of the present invention can be applied to supersonic airfoils of virtually any size, configuration or geometry.

The passive airflow channel configuration of the present invention generates the strong, normal bow shock needed for boom minimization but does so while experiencing significantly lower total drag than a conventional blunted geometry. When a conventional blunted geometry is in supersonic flight, a strong normal shock is generated yielding high surface pressure in the stagnation region and thus high wave drag. To eliminate this problem, a hollow channel is added at the nose of the vehicle and along the wing leading edges. Freestream air flows passively through the channel and is exhausted in a rearward facing direction as shown in FIG. 5. When the channel concept is utilized, the vehicle surface which experiences most of the high pressure on a conventional blunted geometry is removed and thus, use of the channel leads to significantly lower wave drag. If the channel is sufficiently small, then a choked flow condition exists in which a strong normal shock rests in front of the nose and the flow enters the channel subsonically. An effective blunt body is generated by the choked channel, and the overall flow structure is similar to that near a conventional blunted geometry. The analysis conducted of this approach, discussed below, demonstrates that use of the channel assists in breaking the "low-boom, high-drag" paradox by allowing aerodynamically efficient designs which yield minimum ground over-pressure.

A numerical study of the channel configuration of the present invention has been performed for several airfoils and axisymmetric sphere-cone geometries, the results of which are reported herein. Navier-Stokes predictions of the flow were performed using GASP, a multi-block finite volume solver, and it is found that use of a channel significantly improves aerodynamic performance relative to more conventional, blunted geometries. For example, when 5% thick diamond supersonic channel-airfoils with leading edge radii of 5 mm (FIG. 1) are investigated, it is found that total drag (including skin friction) decreases by over 30% when compared with blunted airfoils without channels, for flight at M=2.4. Although skin friction drag increases somewhat, due to the additional surface (wetted) area of the channel, there is a net reduction in total drag due to a large reduction in wave drag. Use of the channel leads to significantly increased lift/drag for a wide range of angles of attack. Similar calculations of axisymmetric nose geometries also demonstrate that use of a channel leads to significantly improved aerodynamic efficiency relative to conventional, blunted geometries.

The desirable effects of the channel of the present invention on pressure signatures are demonstrated by the predicted near-field pressure results. A comparison is made of a generic sharp leading edge geometry. Each of the geometries has a length of c=1 m and a maximum thickness at x/c=0.5 of t/c=0.1585. So that a comparison of the pressure signature across coalesced shocks could be made, each geometry has a sudden increase in wall slope at x/c=0.1. The leading edge shock and the secondary shock (starting at x/c=0.1) coalesce and then reflect off a wall located 0.6 m below the geometries.

The rapid rise and then nearly linear decrease in pressure on the wall correspond to the leading portion of the N-wave that is often observed in far-field pressure distributions of supersonic vehicles. The strong leading edge bow shock generated by the channel geometry results in significantly lower over-pressure (15% lower in this case) after the shocks coalesce. The mechanism for over-pressure reduction is identical to the boom minimization afforded by conventionally blunted geometries. It should of course be realized that the magnitude of over-pressure in the far field will be far lower than that predicted in this near-field simulation. However these near-field preliminary results show that use of the nose channel of the present invention on a given geometry results in significantly lower over-pressure relative to a sharp leading edge geometry with the same body thickness ratio (i.e. slenderness ratio).

Studies of the total drag (including skin friction) show that the channel-airfoil geometry of the present invention has a total drag nearly identical to that of the sharp leading edge airfoil geometry. Thus, the channel geometry of the present invention can result in significantly lower over-pressure relative to a sharp leading edge geometry with virtually no drag penalty. Conventional blunted nose (no channel) geometry, by contrast, experiences approximately 10% higher drag than the sharp leading edge geometry for similar flight conditions.

Figure 2:
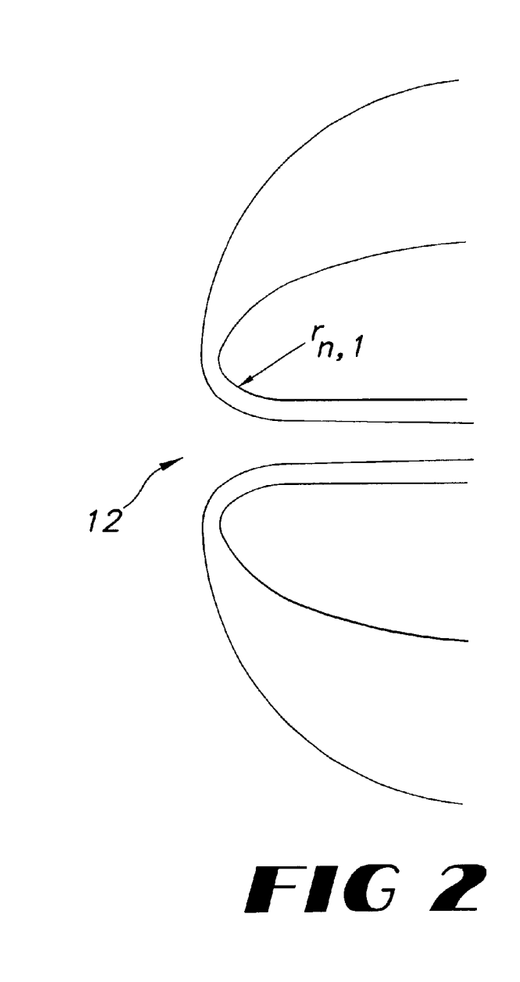
FIG. 2 is a schematic flow profile of a flow "started" flow structure possible when the channel-airfoil of the present invention is utilized.
Figure 3:
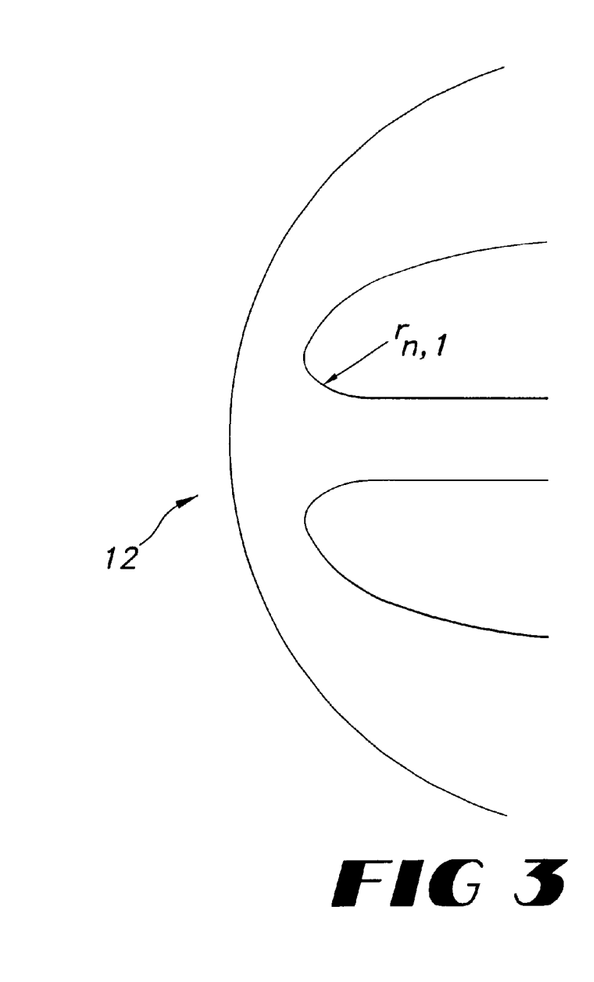
FIG. 3 is a schematic flow profile of a flow "choked" flow structure possible when the channel-airfoil of the present invention is utilized.

When a channel is employed, two different leading edge flow structures are possible, and are depicted in FIGS. 2 and 3. If the channel is sufficiently large, flow will enter the channel supersonically, without a normal shock existing in front of the channel, as shown by FIG. 2. This is identical to the "started" condition in supersonic engine inlets and will occur if the channel thickness $t_c > t^*_c$ where $t^*_c$ is the maximum channel thickness for which a choked flow exists. The value of $t^*_c$ depends on the flight Mach number and the airfoil leading edge radius. When this started condition exists, the heat transfer to the relatively sharp channel lip is much higher than that for the no-channel airfoil.

The second possible flow structure, shown in FIG. 3, occurs if the channel size is sufficiently small. If $t_c < t^*_c$, then a choked flow condition exists, a normal shock rests in front of the channel, and the airflow enters the channel subsonically. In this case, the flow is decelerated significantly through the shock, and the overall flow structure is similar to that of the no-channel airfoil. An "effective blunt body" is generated by the channel and the heat transfer rates at the channel lip are much lower than for the "started" condition airfoil. Because low leading edge heat transfer rates are required for hypersonic vehicles, the choked flow condition is the preferred condition. Accordingly, most of the analysis undertaken in this description of the present invention is performed for geometries in which $t_c < t^*_c$.

It is clear that the wetted surface area and thus the skin friction drag will be increased when a channel is utilized. However, if the channel-airfoil is designed to operate at a choked condition ($t_c < t^*_c$), then it is possible to maintain a subsonic flow through the channel if the channel wall contours are selected appropriately. In this case, the Mach number, velocity, and dynamic pressure inside the channel are significantly lower than the corresponding external supersonic flow quantities. An order of magnitude estimate of the ratio of internal friction drag, $d_{f_{int}}$, to external friction drag, $d_{f_{ext}}$, can be given by:

$$\frac{d_{f_{int}}}{d_{f_{ext}}} = \underbrace{\left(\frac{0.5\rho_{int}V_{int}}{0.5\rho_{ext}V_{ext}}\right)}_{\approx 1}\underbrace{\left(\frac{V_{int}}{V_{ext}}\right)}_{\approx \frac{V_{int}}{V_\infty}}\underbrace{\left(\frac{C_{int}}{c_{ext}}\right)}_{\approx 1}\underbrace{\left(\frac{C_{f_{int}}}{C_{f_{ext}}}\right)}_{\approx \frac{Re_{int}^{-1/7}}{Re_{ext}^{-1/7}}}$$

Note that the internal and external mass fluxes are nearly equal and turbulent flow is assumed to relate skin friction and Reynolds number. If Sutherland's Law is used to relate viscosity and temperatures, the following relationship exists:

$$\frac{d_{f_{int}}}{d_{f_{ext}}} \approx \left(\frac{V_{int}}{V_\infty}\right)\left(\frac{\mu_{int}}{\mu_\infty}\right)^{1/7} \approx \left(\frac{V_{int}}{V_\infty}\right)\left(\frac{T_{int}^{3/2}}{T_\infty^{3/2}}\right)^{1/7}$$

Now consider a $M_\infty=4$ turbulent flow of air around a channel-airfoil. The internal channel flow has experienced a $M_\infty=4$ normal shock, which gives:

$$\frac{d_{f_{int}}}{d_{f_{ext}}} \approx \left(\frac{1}{4.57}\right)(1.35) = 0.29$$

Thus, it can be seen that the friction drag on the internal walls can be much less than the friction drag on the external walls if the flow through the channel remains subsonic. Overall, the channel will yield lower wave drag and increased skin friction drag.

Analysis of Selected 2-D Geometries

The baseline geometry selected for the present drag reduction analysis is the blunted diamond airfoil. Rather than investigate use of the channel on the nearly infinite variety of non-symmetric, supersonic airfoils which have been considered for various supersonic applications, the generic, diamond airfoil was selected because of its very low drag. In fact, for a given t/c, no airfoil in supersonic flight has lower thickness-wave (i.e. zero-lift bluntness) drag than the sharp diamond airfoil. The present study thus seeks to determine if use of a channel can improve the drag behavior of the blunted diamond airfoil which inherently experiences low drag. However, the present invention is believed to be of general applicability in reducing drag and sonic boom on a variety of airfoil and other body geometries.

The baseline, no-channel airfoil selected for most of the analysis herein is 5% thick with a chord length of 1.0 m. The nose radius is 5 mm and channel sizes from 2 mm to 16 mm were evaluated on 2-D airfoils. The channel-airfoil geometries are created by carving away a slice about the center-line of the baseline geometry. This creates sharp leading and trailing edges in the channel-airfoil. Several channel entrance shapes were tested including those with sharp edges and those with rounded edges at the channel entrance. In addition, airfoils whose channel walls diverge slightly were also tested. The various airfoil geometries tested and the key parameters of the 2-D airfoils tested are given in Table 1. The following terminology is used to describe the airfoils:

NC: No-Channel (baseline) airfoil
SNSC: Sharp-Nose Straight-Channel airfoil
RNSC: Round-Nose Straight-Channel airfoil
RNDC: Round-Nose Diverging-Channel airfoil

TABLE 1

Geometric parameters of 2-D airfoils

| Airfoil | $t_c$ | $r_{n,1}$ | $\theta$ | t | $r_n$ | c |
|---------|-------|-----------|----------|------|-------|-----|
| NC      | —     | —         | —        | 0.05 | 0.005 | 1.0 |
| SNSC-1  | 0.004 | 0         | 0        | 0.05 | 0.005 | 1.0 |
| SNSC-2  | 0.008 | 0         | 0        | 0.05 | 0.005 | 1.0 |
| SNSC-3  | 0.016 | 0         | 0        | 0.05 | 0.005 | 1.0 |
| SNSC-4  | 0.002 | 0         | 0        | 0.05 | 0.005 | 1.0 |
| SNSC-5  | 0.004 | 0         | 0        | 0.054| 0.005 | 1.0 |
| RNSC    | 0.004 | 0.0005    | 0        | 0.05 | 0.005 | 1.0 |
| RNDC    | 0.004 | 0.0005    | 0.1      | 0.05 | 0.005 | 1.0 |

Analysis Techniques Utilized

The flowfields around the geometries considered were predicted using two approaches. Reynolds Averaged Navier Stokes predictions of aerodynamic and thermal loads on the bodies are obtained using the Generalized Aerodynamic Simulation Program (GASP) developed by Aerosoft, Inc. This computer code is a well validated, multi-zone, finite volume solver. Both laminar simulations and fully turbulent simulations using the Baldwin-Lomax turbulence model were conducted for the present numerical experiments. No attempt to model the exact turbulent transition location was attempted. Consequently, the true performance of the airfoils considered can be expected to be between that of the predicted fully laminar and the fully turbulent results. The computational grids utilized for the 2-D airfoil studies contained approximately 50,000 grid points. The third order accurate, upwind-biased Roe flux difference splitting scheme was utilized and frozen flow was assumed in each of the simulations. Both the external and internal channel flows are computed simultaneously, in a fully coupled manner, without a "back pressure" boundary condition specified at the exit of the channel.

The second approach used to determine aerodynamic loads is based on a classical shock-expansion technique coupled to a semi-empirical, compressible skin friction drag prediction. This methodology is less accurate than the Navier-Stokes procedure but is of particular value because of its computational efficiency. It is used to efficiently consider use of a channel for a wide range of flight conditions and also provides an independent, "back of the envelope" comparison of the GASP results. The external airfoil geometries are modeled with eight linear panels. Pressure forces are determined by modeling oblique shocks and Prandtl-Meyer expansions which begin at the panel junctions. The laminar skin friction on each of the eight panels is approximated using $$C_f = \frac{0.664\sqrt{C*}}{Re_{\Delta l}}$$

where C* is the Chapman-Rubesin parameter and is based on the reference temperature obtained from Eckert, E. R. G., *Journal of Aeronautical Sciences*, Vol. 22, pp. 585–587, 1955. The Van Driest II method, which is valid for a wide range of Reynolds and Mach numbers for attached flat plate boundary layers, is utilized for turbulent skin friction estimates. Hopkins, E. J., Charts for Predicting Turbulent Skin Friction from the Van Driest Method (II), NASA TN D-6945, October 1972. The present shock-expansion approximation can not model the subsonic region behind the leading edge bow shock and can not model boundary layer separation. Despite the approximate nature of the shock-expansion approach, the results are in reasonable agreement with the laminar and turbulent Navier-Stokes predictions performed with GASP and this tool is quite useful for parametric studies.

2-D Aerodynamic Analysis at Zero Lift

The first series of numerical results are for 2-D flow around airfoils with freestream Mach number of 2.4 and an altitude of 12 km. These calculations can be thought of as modeling the low supersonic flow around unswept wings, or as modeling the flow normal to the leading edge of a hypersonic vehicle with a swept leading edge.

Computed Mach contours for laminar flow around the NC and SNSC-1 airfoils are recorded. The main characteristics of a flow including the bow shock at the leading edge due to bluntness, expansion of the flow as it bends around the top to reach its maximum speed and subsequent compression at the trailing edge as it turns and slows down to join the freestream are captured well. Separation does not occur at mid-chord despite the abrupt change in slope at that location for these basic airfoils. For the SNSC-1 airfoil the flow enters the channel subsonically and remains subsonic through most of the channel. The internal flow slowly accelerates (as the internal boundary layer grows) and becomes supersonic near the end of the channel. It should be noted that even near the end of the channel, distinct boundary layers and a large inviscid core exists. Thus, the flow in the channel for these conditions does not correspond to "fully developed pipe flow."

One of the key questions considered in analyzing the passive airflow channel of the present invention is whether or not a net decrease in drag occurs through use of the channel. Channel-airfoils with several channel thicknesses were investigated, and the drag results are presented in Table 2. It can be seen that when the channel is utilized, significant drag reductions (including skin friction) from 33% to 78% are achieved and the magnitude of drag reduction increases with channel size. However, of the three channel sizes investigated for these flight conditions, only the case with $t_c=0.004$ m (i.e. SNSC-1) exhibits a choked channel entrance with a normal shock in front of the leading edge. With larger channel sizes, the "started condition" is observed and the flow enters the channel supersonically. Although the large channel geometries (e.g. SNSC-2 and SNSC-3) exhibit very low drag, they experience much higher, and therefore undesirable, heat transfer rates at the channel entrance. For the remainder of the cases considered, results are only presented for airfoils with channel sizes small enough to have a choked entrance.

TABLE 2

Drag results computed with GASP.
$M_\infty = 2.4, \alpha = 0°, 12$ km

| Airfoil | $t_c$ | $c_d$ | $c_d$ decrease |
|---|---|---|---|
| NC | — | 0.01748 | — |
| SNSC-1 | 0.004 | 0.01168 | 33% |
| SNSC-2 | 0.008 | 0.00614 | 65% |
| SNSC-3 | 0.016 | 0.00378 | 78% |

Channel geometries in which the channel entrance was rounded and those in which the channel walls diverge slightly were also investigated. A comparison of the inviscid/viscous drag breakdown for the no-channel airfoil (NC) and various channel-airfoils (SNSC-1, RNSC, RNDC) shows that each of the channel-airfoils experiences approximately 35% lower total drag relative to the no-channel geometry at a zero-lift condition. It can be seen that the decrease in wave (inviscid) drag more than makes up for the increase in skin friction (viscous) drag. The diverging-channel geometry experiences somewhat lower drag than the straight-channel airfoils. When a diverging channel is utilized, the pressure on the internal channel walls creates a force component which acts in the upstream direction, thereby further lowering drag. However, although the internal channel flow enters subsonically it becomes supersonic just after the channel entrance. Conversely, in the straight-channel cases the flow remained subsonic through most of the channel.

The higher dynamic pressure in the diverging-channel geometry causes this airfoil to experience higher viscous drag than the straight-channel airfoils.

These Navier-Stokes simulations were repeated assuming fully turbulent flow on the external and internal walls. The drag breakdown for the turbulent simulations shows that, although in turbulent flow skin friction is a larger component of the total drag, the channel-airfoils experience from 14% to 21% total drag relative to the no-channel geometry.

It also was considered whether the drag reductions demonstrated in the previous results exist at other flight conditions. A parametric study of a wide range of Mach numbers and altitudes was conducted using the viscous shock-expansion procedure. Mach numbers from 1.3 to 2.5 and flight altitudes from sea level to 50 km were investigated to determine the range of drag reduction afforded by the channel concept. At $M_\infty=2.5$, a drag reduction of over 30% is observed at low altitudes for laminar flow and over 20% for turbulent flow. These results agree with the Navier-Stokes predictions presented previously. In a sense, the SNSC-1 airfoil is "designed" for $M_\infty=2.5$ because it has the largest channel size which yields a choked flow at the channel entrance for $r_n=0.005$ m . At off-design conditions (i.e. $M_\infty<2.5$), a smaller but significant drag reduction is seen. For Mach numbers larger than the design Mach number (i.e. $M_\infty>25$), the SNSC-1 airfoil will swallow the leading edge shock and the drag reductions will be even greater. However, heat transfer rates will increase. As altitude is increased, holding $M_\infty$ constant, the drag reduction afforded by the channel decreases. This is a consequence of the fact that as altitude increases, Reynolds number decreases and the component of drag due to skin friction increases. Although the presence of the channel increases the component of drag due to skin friction, we see that at $M_\infty=2.5$, use of the channel results in a net reduction in total drag from sea level up to an altitude of 50 km.

A similar analysis was performed for the SNSC-4 airfoil, which is designed to provide a choked flow for $M_\infty<7.0$.. It can be seen that, at sea level, this channel reduces the drag by over 10% relative to the baseline no-channel airfoil. This channel provides drag reduction for a wide range of Mach numbers and altitudes from sea level to over 45 km.

The SNSC airfoils whose results have been described were designed by simply "carving" out a channel from a no-channel airfoil. Thus, while the airfoil thickness (i.e. distance from the top to the bottom of the airfoil) is the same for each of the airfoils, the total airfoil enclosed area is somewhat different for each case. For the SNSC-1 airfoil ($t_c$=0.004 m), the enclosed area loss is small (8%) while the zero-lift drag reduction is large (33% for SNSC). However, the area inside an airfoil, or more precisely, the volume in the wing, is important because it typically is needed for structural members. Often the main wing enclosed volume is also used for fuel storage. Thus, it is also useful to compare the baseline airfoil with the SNSC-5 airfoil, which has the same enclosed area. The results of a viscous shock-expansion comparison of such airfoils are given in Table 3. Although the SNSC-5 airfoil is somewhat thicker than the baseline no-channel airfoil, it has 28% less drag. Thus, even if no loss in wing volume can be tolerated, the channel-airfoil gives significantly improved performance.

TABLE 3

Drag results comparing no-channel and channel-airfoils with the same enclosed area. $M_\infty = 2.4, \alpha= 0°, 12$ km

| Airfoil | $t_c$ [m] | t [m] | c [m] | Enclosed Area [$m^2$] | $c_d$ | $c_d$ decrease |
|---|---|---|---|---|---|---|
| NC | — | 0.05 | 1.0 | 0.05 | 0.018 | — |
| SNSC-5 | 0.004 | 0.054 | 1.0 | 0.05 | 0.013 | 28% |

2-D Aerodynamic Analysis at Lifting Conditions

The results discussed above show that the use of the channel configuration of the present invention on a supersonic body can reduce drag at zero lift. The flow structure and the drag at lifting conditions are now compared for no-channel and channel-airfoil geometries.

Pressure contours were computed using GASP for the NC, SNSC-1, RNSC, and RNDC airfoils at $\alpha=5°$. The choking of the flow for the channel cases at this angle of attack is clearly visible and the overall flow structure which was observed at $\alpha=0°$ is maintained. However at this angle of attack, the flow at the channel entrance is non-symmetric. A suction peak occurs above the lower channel wall and a compression occurs at the upper channel wall. The flow through the channel becomes nearly symmetric shortly downstream of the entrance region.

Computed sectional drag coefficients (from Navier-Stokes simulations) are shown as a function of angle of attack for laminar and fully turbulent flow respectively. It can be seen that the channel-airfoils experience lower total drag than the no-channel airfoil for all angles of attack tested. Use of the channel results in a nearly uniform downward shift in sectional drag coefficient. For laminar flow, the diverging-channel airfoil (RNDC) experiences slightly lower drag than the straight-channel cases.

It is found that the lift generated by the airfoils is unaffected by use of the channels considered. The drag reduction experienced at all angles of attack thus allows significant net increases in aerodynamic efficiency, i.e. lift-to-drag ratio (L/D). The maximum L/D is increased by approximately 35% for laminar flow and approximately 20% for turbulent flow when the channel is utilized. The results of these angle of attack studies and the previous parametric studies indicate that improved performance can be achieved at variable and off-design flight conditions. There is no abrupt change in sectional drag or lift at any angle of attack or supersonic Mach number.

Finally, the sectional moment coefficient about the quarter chord location is shown as a function of angle of attack for laminar flow. Use of a channel results in a lower moment curve slope, thereby somewhat enhancing the stability of the airfoil relative to the no-channel geometry.

The supersonic channel-airfoil concept is found to reduce total drag and increase L/D by over 30% for laminar flow and over 20% for turbulent flow relative to geometries without channels. The ability of the channel concept to significantly improve the aerodynamic performance of blunted vehicles in supersonic flight make it potentially beneficial for several types of applications. These applications include blunted planetary entry vehicles and supersonic cruise aircraft.

Planetary entry vehicles are significantly blunted so that heating rates will be tolerable during the initial phases of atmospheric insertion. Although high drag is desirable for the initial phases of these missions, it would be beneficial to have the ability to open a channel after the maximum heating rate flight condition has been passed. Doing so would substantially increase the L/D, and high L/D is required for entry vehicles to achieve the cross-range capability necessary for precise selection of landing or impact site. The above-described closure mechansims enable such selective opening/closing of the channel. Supersonic cruise aircraft whose leading edges are blunted for low speed stall mitigation may benefit from a channel which opens along at least part of the wing span at supersonic cruise.

During takeoff and landing, and at subsonic speeds, it will typically be desirable to close the airflow channel. Upon reaching supersonic speeds, the channel can be opened. A channel of adjustable thickness may also be utilized, permitting the channel thickness to be reduced as the Mach number increases, in order to maintain choked flow.

Additional Embodiments

Additional alternate embodiments of the channel configuration of the present invention are shown in FIG. 6. Instead of exhausting the flow at the trailing edge, as in the embodiment of FIG. 1, the flow is exhausted to one side of the body. This can be applied to any blunted shape but is illustrated in FIG. 6 on a diamond airfoil. If the flow through the channel is exhausted to the underside of the body it will increase lift. An additional benefit of these embodiments is that the boundary layer blowing will tend to decrease the momentum of the boundary layer on the lower external surface. If the boundary layer on that surface is turbulent, then the skin friction drag on that surface will be reduced. The supersonic channel concept may also be applied to a non-symmetric blunted vehicle. Again in that embodiment the channel should be designed to exhaust onto the lower surface if lift enhancement is desired. Each of the embodiments indicated will result in drag reduction.

Finally, it should be noted that the drag and sonic boom advantages apply not only when the channel is applied to leading edges of airfoils but also to the nose of any aerodynamic body. For example, use of a channel may be illustrated on a blunted sphere-cone body. This body is a generic representation of the nose of a missile, aircraft, or re-entry vehicle designed for supersonic flight.

While the invention has been explained in relation to its preferred embodiments, it is to be understood that various modifications thereof will become apparent to those skilled in the art upon reading this specification. The aforementioned examples and embodiments are, therefore, to be considered in all respects as illustrative rather than restrictive, and the invention is not to be limited to the details given therein. Therefore, it is to be understood that the invention disclosed herein is intended to cover such modifications as fall within the scope of the appended claims.

What is claimed is:

1. A body component for reducing drag during at least supersonic motion of the body component in a flow, the motion being in a direction of travel, said body component comprising a leading edge, a trailing edge generally opposite said leading edge, an upper surface extending between said leading edge and said trailing edge, and a lower surface extending between said leading edge and said trailing edge and separated a distance from said upper surface, thereby defining an interior volume within said body component, said body component further comprising a channel extending through said interior volume between an inlet opening at said leading edge and a single outlet opening in said body component below said upper surface, wherein said channel has a cross-sectional area whereby at the at least supersonic motion of the body component, a detached normal shock wave develops in front of said leading edge so the flow enters said channel with subsonic relative motion, creating a subsonic section at the inlet opening of said channel.

2. The body component of claim 1, wherein said body component comprises an airfoil.

3. The body component of claim 2, wherein the cross-sectional area of said channel is generally constant throughout, and wherein said inlet opening comprises a sharp nose.

4. The body component of claim 2, wherein the cross-sectional area of said channel is generally constant throughout, and wherein said inlet opening comprises a rounded nose.

5. The body component of claim 2, wherein said cross-sectional area of said channel increases from said inlet opening toward said outlet opening, and wherein said inlet opening comprises a sharp nose.

6. The body component of claim 2, wherein said cross-sectional area of said channel increases from said inlet opening toward said outlet opening, and wherein said inlet opening comprises a rounded nose.

7. The body component of claim 1, wherein said lower surface comprises said outlet opening.

8. The body component of claim 1, wherein said body component is an aircraft nose section.

9. A body component for reducing drag during at least supersonic motion of the body component in a fluid, the motion being in a direction of travel, said body component comprising:
  (a) a leading edge facing towards said direction of travel, a trailing edge opposite said leading edge, an upper surface extending between said leading edge and said trailing edge, and a lower surface extending between said leading edge and said trailing edge and separated a distance from said upper surface, thereby defining an interior volume within said body component; and
  (b) a conduit for conducting a stream of the fluid through a portion of said interior volume, said conduit extending between an inlet at said leading edge for receiving the stream of fluid and a single outlet for discharging the stream of fluid from said conduit below said upper surface;
  wherein said conduit has a cross-sectional area whereby at the at least supersonic motion of the body component, a detached normal shock wave develops in front of said leading edge so the fluid enters said conduit with subsonic relative motion, creating a subsonic section at the inlet of said conduit.

10. The body component of claim 9, wherein said body component comprises an airfoil, said conduit comprises a uniform cross-sectional area along the length of the conduit, and said inlet comprises a sharp nose.

11. The body component of claim 9, wherein said body component comprises an airfoil, said conduit comprises a uniform cross-sectional area along the length of the conduit, and said inlet comprises a rounded nose.

12. The body component of claim 9, wherein said body component comprises an airfoil, said conduit comprises an increasing cross-sectional area along the length of the conduit from the inlet to the outlet, and said inlet comprises a sharp nose.

13. The body component of claim 9, wherein said body component comprises an airfoil, said conduit comprises an increasing cross-sectional area along the length of the conduit from the inlet to the outlet, and said inlet comprises a rounded nose.

14. The body component of claim 9, wherein the stream of fluid through said conduit comprises a subsonic flow.

15. The body component of claim 9, wherein said outlet for discharging the stream of fluid from said conduit is on said lower surface.

16. A method for reducing drag on an at least supersonic airfoil incorporating a leading edge, a trailing edge opposite said leading edges an upper surface extending between said leading edge and said trailing edge, and a lower surface extending between said leading edge and said trailing edge and separated a distance from said upper surface, thereby defining an interior volume within said airfoil said method comprising providing a channel through said airfoil extending between an inlet adjacent the leading edge of the airfoil and a single outlet located below said upper surface, generating a detached normal shock adjacent the inlet to the channel, and introducing a fluid stream through the channel;

wherein the channel has a cross-sectional area whereby at the at least supersonic motion of the airfoil, the detached normal shock develops adjacent the inlet to the channel so the fluid stream enters the channel with subsonic relative motion, creating a subsonic section adjacent the inlet of the channel.

17. The method of claim 16, wherein the fluid stream through the channel flows from the channel inlet to an outlet on said lower surface.

18. A body component for reducing sonic boom generated by a body in at least supersonic motion in a flow, the motion being in a direction of travel, said body component comprising a leading edge, a trailing edge generally opposite said leading edge, an upper surface extending between said leading edge and said trailing edge, and a lower surface extending between said leading edge and said trailing edge and separated a distance from said upper surface, thereby defining an interior volume within said body component, said body component further comprising a channel extending through said interior volume between an inlet opening at said leading edge and a single outlet below said upper surface, wherein said channel has a cross-sectional area whereby at the at least supersonic motion of the body component, a detached normal shock wave develops in front of said leading edge so the flow enters said channel with subsonic relative motion, creating a subsonic section at the inlet opening of said channel.

19. The body component of claim 18, wherein said outlet opening is on said lower surface.

20. A body component for reducing sonic boom generated by motion of an at least supersonic body in a fluid, the motion being in a direction of travel, said body component comprising:

(a) a leading edge facing towards said direction of travel, a trailing edge opposite said leading edge, an upper surface extending between said leading edge and said trailing edge, and a lower surface extending between said leading edge and said trailing edge and separated a distance from said upper surface, thereby defining an interior volume within said body component; and (b) a conduit for conducting a stream of the fluid through a portion of said interior volume, said conduit extending between an inlet at said leading edge for receiving the stream of fluid and a single outlet for discharging the stream of fluid from said conduit below said upper surface;

wherein said conduit has a cross-sectional area whereby at the at least supersonic motion of the body component, a detached normal shock wave develops in front of said leading edge so the fluid enters said conduit with subsonic relative motion, creating a subsonic section at the inlet of said conduit.

21. The body component of claim 20, wherein said outlet for discharging the stream of fluid from said conduit is on said lower surface.

22. A method for reducing sonic boom generated by an at least supersonic airfoil incorporating a leading edge, a trailing edge opposite said leading edge, an upper surface extending between said leading edge and said trailing edge, and a lower surface extending between said leading edge and said trailing edge and separated a distance from said upper surface, thereby defining an interior volume within said airfoil, said method comprising providing a channel through said airfoil extending between an inlet adjacent the leading edge of the airfoil and a single outlet located below said upper surface, generating a detached normal shock adjacent the inlet to the channel, and introducing a fluid stream through the channel;

wherein the channel has a cross-sectional area whereby at the at least supersonic motion of the airfoil, the detached normal shock develops adjacent the inlet to the channel so the fluid stream enters the channel with subsonic relative motion, creating a subsonic section adjacent the inlet of the channel.

* * * * *